United States Patent [19]

Sawamoto et al.

[11] Patent Number: 5,246,556
[45] Date of Patent: Sep. 21, 1993

[54] PROCESS AND APPARATUS FOR PRODUCING HIGH CONCENTRATING OZONE WATER

[75] Inventors: Isao Sawamoto; Yoshinori Nishiki, both of Kanagawa, Japan

[73] Assignee: Permelec Electrode Ltd., Kanagawa, Japan

[21] Appl. No.: 610,663

[22] Filed: Nov. 8, 1990

[30] Foreign Application Priority Data

Nov. 10, 1989 [JP] Japan .................. 1-293093

[51] Int. Cl.[5] .............................................. C25B 1/02
[52] U.S. Cl. .................................................. 204/176
[58] Field of Search .................... 261/118, DIG. 42; 204/176; 422/186.07

[56] References Cited

U.S. PATENT DOCUMENTS

| | | | |
|---|---|---|---|
| 1,420,046 | 6/1922 | MacGregor et al. | 210/760 |
| 2,778,800 | 1/1957 | Sheahan | 261/DIG. 42 |
| 3,761,065 | 9/1973 | Rich et al. | 261/DIG. 42 |
| 3,904,521 | 9/1975 | Stopka | 210/704 |
| 4,507,253 | 3/1985 | Wiesmann | 261/DIG. 42 |

FOREIGN PATENT DOCUMENTS 0342169 11/1989 European Pat. Off. .
1046363 10/1966 United Kingdom .

Primary Examiner—John Niebling
Assistant Examiner—Brian M. Bolam
Attorney, Agent, or Firm—Sughrue, Mion, Zinn, Macpeak & Seas

[57] ABSTRACT

A process for producing high concentration ozone water, which comprises contacting an ozone-containing gas with fine droplets of water to dissolve ozone in the ozone-containing gas into the fine droplets of water.

3 Claims, 1 Drawing Sheet

PROCESS AND APPARATUS FOR PRODUCING HIGH CONCENTRATING OZONE WATER

FIELD OF THE INVENTION

The present invention relates to a process for producing high concentration ozone water by efficiently dissolving an ozone-containing gas in water, and an apparatus therefor.

BACKGROUND OF THE INVENTION

Ozone is being given attention as a strong and clean oxidizing agent. In particular, the use of ozone for water treatment is increasing because the decomposition product thereof is oxygen and the residue thereof does not remain in the treated material, which is different form chlorine series oxidizing agents which have conventionally used and because the decomposition rate thereof is fast.

A discharging process and an electrolytic process have been mainly employed to generate ozone which is useful as an oxidizing agent as described above. For water treatment, etc., the practice is to contact the ozone-containing gas with the water being treated. In many cases, the general practice has to supply gaseous ozone to a mixing tank through, e.g., a filter to remove impurities with the filter and also to disperse the gaseous ozone in the water being treated. Many filters such as Rasching rings, etc., made from a corrosion resistant material have been used as conventional filters used for the above purpose. The ozone seems to be almost completely dissolved in the water to generate uniform ozone water which does not contain any gaseous ozone. However, since the solubility of ozone itself in water is low and ozone exists in the form of bubbles, ozone cannot be sufficiently dispersed in water by this method.

In the case of the electrolytic process, a special method that the water being treated is directly sent into the anode chamber of the electrolytic cell is proposed. However, an electrode material, etc., often contaminates the water. Moreover, another critical problem that the cell is damaged with impurities contained in the water occurs.

Production of ozone water having a higher concentration is preferred to utilize efficiently the ozone formed by an electrolysis or to discharge and treat water being treated in a short period of time. Thus, the development of a process and apparatus capable of easily producing ozone water having a high concentration has been desired.

SUMMARY OF THE INVENTION

The present invention overcomes the above-described problems in conventional techniques in the difficultly in obtaining ozone water having a high concentration with the ozone formed by an electrolytic process or a discharging process.

Accordingly, one object of the present invention is to provide a process for easily producing ozone water having a high concentration.

Another object of the present invention is to provide an apparatus for practicing the above-described process.

According to the first embodiment of the present invention, the present invention provides a process for producing high concentration ozone water, which comprises contacting an ozone-containing gas with fine droplets of water to dissolve ozone in an ozone-containing gas into the fine droplets of water.

According to the second embodiment of the present invention, the present invention provides an apparatus for producing high concentration ozone water, including dissolution bath for producing ozone water by dissolving an ozone-containing gas in water, with the dissolution bath comprising a spraying portion for forming fine droplets of water by spraying water therethrough, an inlet for supplying an ozone-containing gas, and an outlet for withdrawing ozone water formed.

BRIEF DESCRIPTION OF THE DRAWING

The FIGURE is a schematic sectional view showing one example of the apparatus for producing high concentration ozone water in accordance with the present invention.

DETAILED DESCRIPTION OF THE INVENTION

Figure 1:
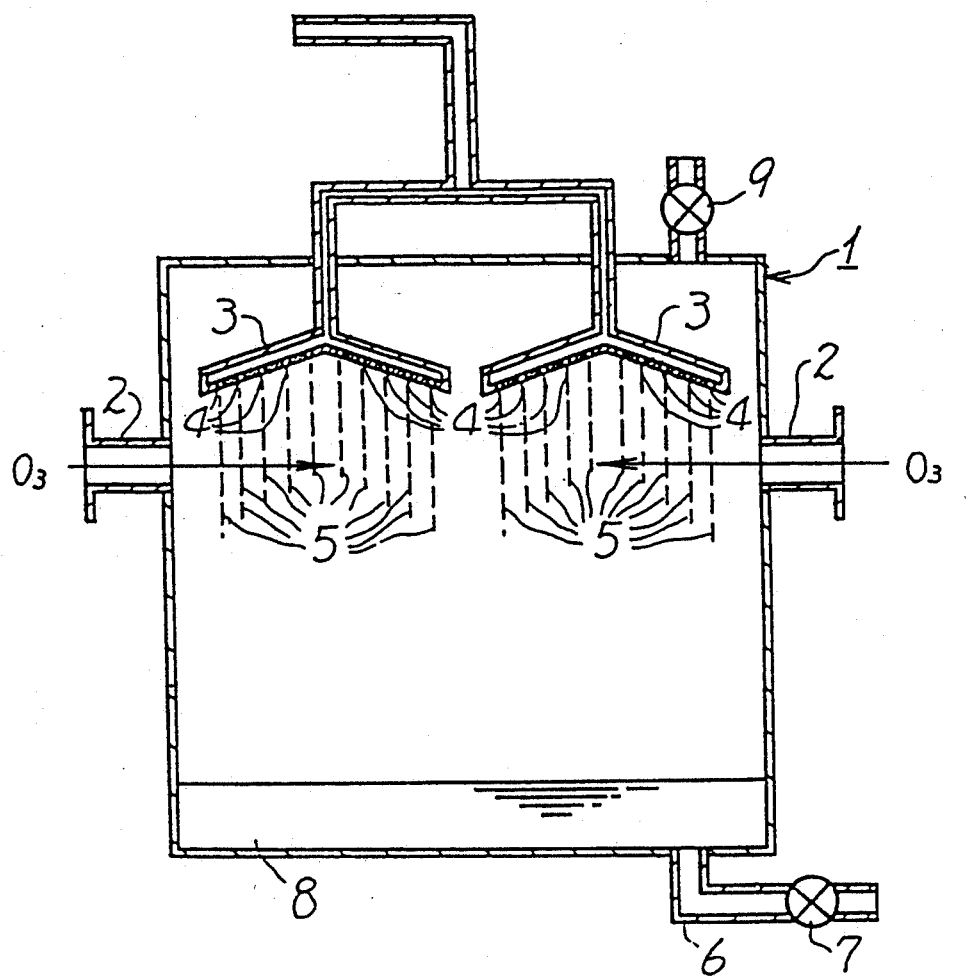

A feature of the present invention is to produce high concentration ozone water by contacting ozone obtained by various processes such as an electrolytic process, a discharging process, etc., as a simple ozone-containing gas or an ozone-containing gas as a gas-liquid mixture with fine droplets of water to dissolve the ozone in the fine water droplets. The electrolytic process, the discharging process, etc., are disclosed in, for example, U.S. Pat. No. 4,416,747.

For producing high concentration ozone water by dissolving ozone in water, which is relatively reluctant to dissolve in water, it is necessary to contact the ozone-containing gas with water at a large contact area, and as the contact area increases, ozone water having a higher concentration can be produced.

The fine droplets of water used in the present invention have a water droplet size of from about 0.1 $\mu$m to about 1 mm and preferably from 1 to 100 $\mu$m.

In the present invention, there is no particular restriction on the manner of forming fine droplets of water, but it is preferred to spray water through slits. Other methods for forming fine droplets of water include a steam-quenching method, and the like, and the fine water droplets (mist-like) thus formed are fed to a chamber filled with the ozone-containing gas to contact the fine water droplets and the ozone-containing gas.

The contacting of the ozone-containing gas with the fine droplets of water is conducted at a temperature of from 0° to 50° C. and preferably from 5° to 25° C. under a pressure of from 1 to 10 atm and preferably from 1 to 4 atm.

The concentration of the ozone-containing gas initially contacted with the water is from 1 to 50 wt % and preferably from 5 to 20 wt %.

In the present invention, the dissolution of ozone in the fine droplets of water is conducted in a dissolution bath. The dissolution bath which can be used in the present invention has a spraying means for forming fine droplets of water by spraying water, an inlet for supplying an ozone gas-containing gas into the dissolution bath for contacting the ozone gas with the fine droplets of water, and an outlet for withdrawing high concentration ozone water which is formed from the bath.

For producing high concentration ozone water using the dissolution bath, after preferably replacing the gas in the bath with an ozone-containing gas, water, preferably pure water, for dissolving ozone is sprayed into the dissolution bath to supply water as fine droplets into the bath while gradually supplying an ozone-containing gas into the bath. As a result, the fine water droplets having a large surface area are contacted with the ozone-containing gas present in the dissolution bath and the ozone is dissolved in the fine water droplets.

The fine droplets of water having ozone dissolved therein fall downward as high concentration ozone water.

The high concentration ozone water is withdrawn through the outlet from the bath at a suitable stage for a use. In addition, when the concentration of the ozone-containing water obtained using the above operation is insufficient, the ozone-containing water can be sprayed again into the dissolution bath for contact with more ozone-containing gas in the bath to increase the ozone concentration.

In this case, the supplying rates of water and the ozone-containing gas can be appropriately selected such that ozone water having a necessary concentration can be obtained. In general, the supply rates are $G/L=0.01$ to 10, preferably 0.1 to 5 (by volume ratio), wherein G is an amount of the ozone-containing gas supplied and L is an amount of the water supplied. However, in the selection of the supplying rates it is preferred for the ozone-containing gas in the dissolution bath to be completely dissolved in water without escaping from the bath to use the ozone-containing gas in an effective manner. Also, it is necessary to consider that water supplied in the dissolution bath is all withdrawn from the bath as ozone water having a desired concentration. In other words, in the present invention, the ozone-containing gas supplied to the dissolution bath can be fully and effectively used for the production of ozone water. As a result, the treatment of withdrawing a non-ozone-containing gas from the bath becomes unnecessary and high concentration ozone water is obtained as well as other advantages of operation can be obtained.

The concentration of ozone in the ozone-containing water which can be produced using the invention is 1 to 100 mg/l, preferably 5 to 50 mg/l. Further, when the concentration of the ozone-containing water produced is insufficient for efficient use of the ozone, the contacting and recycling is generally conducted 2 to 5 times to obtain the desired high concentration of ozone.

The production of high concentration ozone water by the process of the present invention is explained below in greater detail by reference to an example of the apparatus of the present invention shown in the accompanying drawing.

EXAMPLE

Ozone water was produced using the high concentration ozone water producing apparatus shown in the accompanying drawing under the following conditions.

In an electrolytic cell (not shown) having an electrolytic effective area of 90 cm$^2$ was placed a diaphragm made from a perfluorosulfonic acid membrane (NAFION 117, trademark, manufactured by Du Pont) which was a solid electrolyte with lead dioxide powder attached to the anode side and a platinum powder attached to the cathode side to provide a solid electrolyte-type electrolytic cell and the electrolytic cell was filled with one liter of pure water. By passing an electric current through the electrolytic cell at a current density of 100 A/dm$^2$, a mixed gas of ozone and oxygen containing 15% by weight of ozone was obtained at a rate of 27 g/hr (about 20 liters/hr at 30° C.) or 4 g/hr of ozone.

After separating the mixed gas from the liquid phase, the ozone-containing gas was supplied to a dissolution bath 1 having a length of 10 cm, a width of 10 cm, and a height of 40 cm (volume of 4 liters) through an inlet 2 for ozone-containing gas. As a result, the gas in the dissolution bath 1 was completely replaced with ozone-containing gas. Thereafter, pure water for dissolving ozone therein was supplied to the dissolution bath 1 by spraying the water through many slits 4 of two spraying portions 3 from the upper portion of the dissolution bath 1 at a rate of 0.1 liter/min. to form fine droplets 5 of water. Also the ozone-containing gas was supplied to the dissolution bath 1 such that the gas pressure in the bath became constant by adjusting a gas exhaust valve 9. After 10 minutes, a valve 7 of an outlet 6 from the dissolution bath 1 was opened to remove ozone water 8 at the bottom of the dissolution bath 1. The concentration of the ozone water was measured and the concentration of the ozone was found to be about 25 p.p.m.

The ozone water was supplied again to the dissolution bath using the spraying portions 3 for contact with the ozone-containing gas, and ozone water was removed. The concentration of ozone water was measured and the concentration of ozone was found to be about 35 p.p.m.

COMPARISON EXAMPLE

In the dissolution bath described in Example 1 above was placed 1 liter of pure water, and the ozone-containing gas as described in Example 1 was bubbled into pure water in the bath through a pipe having an inside diameter of 1 cm at a rate of about 20 liters/hr. After 10 minutes, the concentration of the ozone in the water was measured. The concentration was found to be 5 p.p.m.

As described above, according to the process of the present invention, high concentration ozone water can be produced by contacting an ozone-containing gas with fine droplets of water to dissolve the ozone in the ozone-containing gas in the fine water droplets. Further, by contacting the ozone-containing gas with the fine water droplets having a large surface area, ozone water having a higher ozone concentration than that obtainable using the conventional process of, for example, dissolving ozone in water by bubbling an ozone-containing gas into the water can be obtained.

In the apparatus of the present invention, high concentration ozone water is produced using a dissolution bath having a spraying means for forming fine droplets of water by spraying water therethrough, an inlet for supplying an ozone-containing gas, and an outlet for withdrawing the ozone water formed. In the apparatus, high concentration ozone water can be produced by contacting an ozone-containing gas with fine water droplets having a large surface area. Furthermore, since the ozone-containing gas supplied into the dissolution bath can be continuously used for the production of ozone water without removal from the bath, the ozone-containing gas produced by an electrolytic process or a discharging process can be efficiently used. Moreover, since it becomes unnecessary to treat the ozone-containing gas removed from the bath, high concentration ozone water can be produced at a low cost.

While the invention has been described in detail and with reference to specific embodiments thereof, it will be apparent to one skilled in the art that various changes and modifications can be made therein without departing from the spirit and scope thereof.

What is claimed is:

1. A process for producing high concentration ozone water, which comprises contacting an ozone-containing gas with fine droplets of pure water to dissolve ozone in the ozone-containing gas into the fine droplets of water; wherein said fine droplets of water (1) have a water droplet size of from about 0.1 μm to about 1 mm, and (2) are sprayed downward through nozzles; and wherein the ozone concentration of the water product is from 5 to 50 mg/l.

2. The process as in claim 1, wherein the ozone-containing gas is produced by an electrolytic process or a discharging process.

3. The process as in claim 1, wherein the fine droplets of water are formed by spraying water through slits or nozzles.